(12) United States Patent
Kanayama

(10) Patent No.: US 9,335,610 B2
(45) Date of Patent: May 10, 2016

(54) IMAGE PICKUP SYSTEM AND LENS APPARATUS

(75) Inventor: Masaomi Kanayama, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 609 days.

(21) Appl. No.: 12/919,705

(22) PCT Filed: May 18, 2009

(86) PCT No.: PCT/JP2009/002169
§ 371 (c)(1),
(2), (4) Date: Aug. 26, 2010

(87) PCT Pub. No.: WO2009/141988
PCT Pub. Date: Nov. 26, 2009

(65) Prior Publication Data
US 2011/0001822 A1 Jan. 6, 2011

(30) Foreign Application Priority Data
May 19, 2008 (JP) .................................. 2008-130658

(51) Int. Cl.
| H04N 7/18 | (2006.01) |
| G03B 17/18 | (2006.01) |
| G03B 13/36 | (2006.01) |
| H04N 5/232 | (2006.01) |

(52) U.S. Cl.
CPC ............... *G03B 17/18* (2013.01); *G03B 13/36* (2013.01); *H04N 5/23209* (2013.01); *H04N 5/23212* (2013.01); *H04N 5/23293* (2013.01); *H04N 5/23296* (2013.01)

(58) Field of Classification Search
None
See application file for complete search history.

(56) References Cited

U.S. PATENT DOCUMENTS

| 5,979,297 A | 11/1999 | Ricco |
| 6,647,205 B1 | 11/2003 | Kindaichi et al. |

(Continued)

FOREIGN PATENT DOCUMENTS

| CN | 1190699 A | 8/1998 |
| CN | 1519639 A | 8/2004 |

(Continued)

OTHER PUBLICATIONS

International Search Report and Written Opinion issued in related PCT/JP2009/002169, mailed Aug. 11, 2009.

(Continued)

*Primary Examiner* — Frederick Bailey
(74) *Attorney, Agent, or Firm* — Rossi, Kimms & McDowell LLP

(57) ABSTRACT

The image pickup system includes a lens apparatus (1) and a camera (2) configured to perform image pickup of objects in an image pickup area using the lens apparatus. The lens apparatus includes a ranging sensor (120) configured to simultaneously detect object distances in plural ranging areas set in the image pickup area. The image pickup system includes an output image generator (203) configured to generate an output image containing (a) a captured image captured by the camera and (b) distance information showing at least one of the object distance detected by the ranging sensor in each of the plural ranging areas and a difference between the detected object distances. The image pickup system is capable of displaying the object distances to plural objects or a difference therebetween without performing focusing for the respective objects.

13 Claims, 13 Drawing Sheets

(56) References Cited

U.S. PATENT DOCUMENTS

| | | | |
|---|---|---|---|
| 7,405,762 | B2 | 7/2008 | Nonaka et al. |
| 7,920,959 | B1* | 4/2011 | Williams ................ 701/117 |
| 2002/0057908 | A1* | 5/2002 | Otani ........................ 396/51 |
| 2003/0107649 | A1* | 6/2003 | Flickner et al. ........... 348/150 |
| 2003/0193657 | A1 | 10/2003 | Uomori et al. |
| 2004/0105090 | A1* | 6/2004 | Schultz et al. ............ 356/141.5 |
| 2005/0046966 | A1* | 3/2005 | Okawara ..................... 359/696 |
| 2006/0111842 | A1* | 5/2006 | Sugimoto et al. ......... 701/301 |
| 2006/0268257 | A1 | 11/2006 | Ogawa |
| 2006/0290932 | A1 | 12/2006 | Kawanami |
| 2007/0285528 | A1 | 12/2007 | Mise et al. |
| 2008/0100738 | A1 | 5/2008 | Tsuchiya et al. |

FOREIGN PATENT DOCUMENTS

| | | | |
|---|---|---|---|
| CN | 1190699 | C | 2/2005 |
| CN | 101175162 | A | 5/2008 |
| JP | 08-146287 | A | 6/1996 |
| JP | 11-183787 | A | 7/1999 |
| JP | 2003-329915 | A | 11/2003 |
| JP | 2004-349832 | A | 12/2004 |
| JP | 2005-123823 | A | 5/2005 |
| JP | 2006-154654 | A | 6/2006 |
| JP | 2006136706 | | 6/2006 |
| JP | 2006-267123 | A | 10/2006 |
| JP | 2007-127923 | A | 5/2007 |
| JP | 2008-040146 | A | 2/2008 |
| JP | 2008-107668 | A | 5/2008 |
| WO | 9961948 | A1 | 12/1999 |

OTHER PUBLICATIONS

Office Action issued in corresponding Japanese Patent Application 2010-544494 dated Dec. 18, 2013.
Extended European search report issued in European Patent Application EP 09750350.2 dated Feb. 21, 2012.
EP OA issued May 16, 2013 for corres. EP 09750350.2.
Office Action issued in CN200980117718.6, mailed Nov. 6, 2012. English translation provided.
Office Action issued in CN201310352559.6, mailed Aug. 5, 2015. English translation provided.

* cited by examiner

IMAGE PICKUP SYSTEM AND LENS APPARATUS

This application is a U.S. National Phase Application of PCT International Application PCT/JP2009/002169 filed on May 18, 2009 which is based on and claims priority from JP 2008-130658 filed on May 19, 2008 the contents of which is incorporated herein in its entirety by reference.

TECHNICAL FIELD

The present invention relates to an image pickup system and a lens apparatus included therein, the lens apparatus having a ranging (distance measuring) function.

BACKGROUND ART

In live marathon telecasts, a distance between a leading runner and a following runner is often announced. The announced distance between the leading and following runners is a rough distance obtained by visual measurement by an announcer or a reporter, or a distance calculated based on a time from a passage of the leading runner at a certain point to that of the following runner and running speeds of the respective runners. Therefore, the distance between the runners announced by the announcer or the reporter is not accurate. Moreover, viewers cannot visually understand the distance only by voices of the announcer or the reporter.

Japanese Patent Laid-Open No. 2003-329915 has disclosed an image pickup system which first allows manual focus for a first object and calculates a distance to the first object based on a focus lens position when an in-focus state for the first object is obtained, and then allows manual focus for a second object and calculates a distance to the second object based on a focus lens position when an in-focus state for the second object is obtained. Further, the image pickup system calculates a difference between the calculated distances to the first and second objects to display information on the difference in a superimposed manner on a video signal.

However, the image pickup system disclosed in Japanese Patent Laid-Open No. 2003-329915 requires manual focus for the respective first and second objects to calculate the distance thereto. In other words, the image pickup system cannot calculate the distance to the second object with maintaining the in-focus state for the first object that is a main image pickup subject.

Moreover, since the image pickup system disclosed in Japanese Patent Laid-Open No. 2003-329915 first calculates the distance to the first object, and then calculates the distance between the first and second objects after the manual focus for the second object is performed, an actual distance between the first and second objects may change before the distance is calculated. In other words, even if the actual distance between the first and second objects changes every second in a marathon race or the like, the image pickup system cannot reflect the change quickly to calculate the distance between the first and second objects.

SUMMARY OF INVENTION

The present invention provides an image pickup system and a lens apparatus which are capable of displaying distances to plural objects or a difference therebetween without performing focusing for the respective objects.

The present invention provides as one aspect thereof an image pickup system including a lens apparatus and a camera configured to perform image pickup of objects in an image pickup area through the lens apparatus. The lens apparatus includes a ranging sensor configured to simultaneously detect object distances in plural ranging areas set in the image pickup area. The image pickup system includes an image generator configured to generate an output image containing a captured image captured by the camera and distance information showing at least one of the object distance detected by the ranging sensor in each of the plural ranging areas and a difference between the detected object distances.

Further, the present invention provides as another aspect thereof a lens apparatus used for an image pickup system which includes a camera configured to perform image pickup of objects in an image pickup area through the lens apparatus. The lens apparatus includes a ranging sensor configured to simultaneously detect object distances in plural ranging areas set in the image pickup area. The image pickup system includes an output image generator configured to generate an output image containing a captured image captured by the camera and distance information showing at least one of the object distance detected by the ranging sensor in each of the plural ranging areas and a difference between the detected object distances.

DESCRIPTION OF EMBODIMENTS

Exemplary examples of the present invention will hereinafter be described with reference to the accompanying drawings.

EXAMPLE 1

Figure 1:
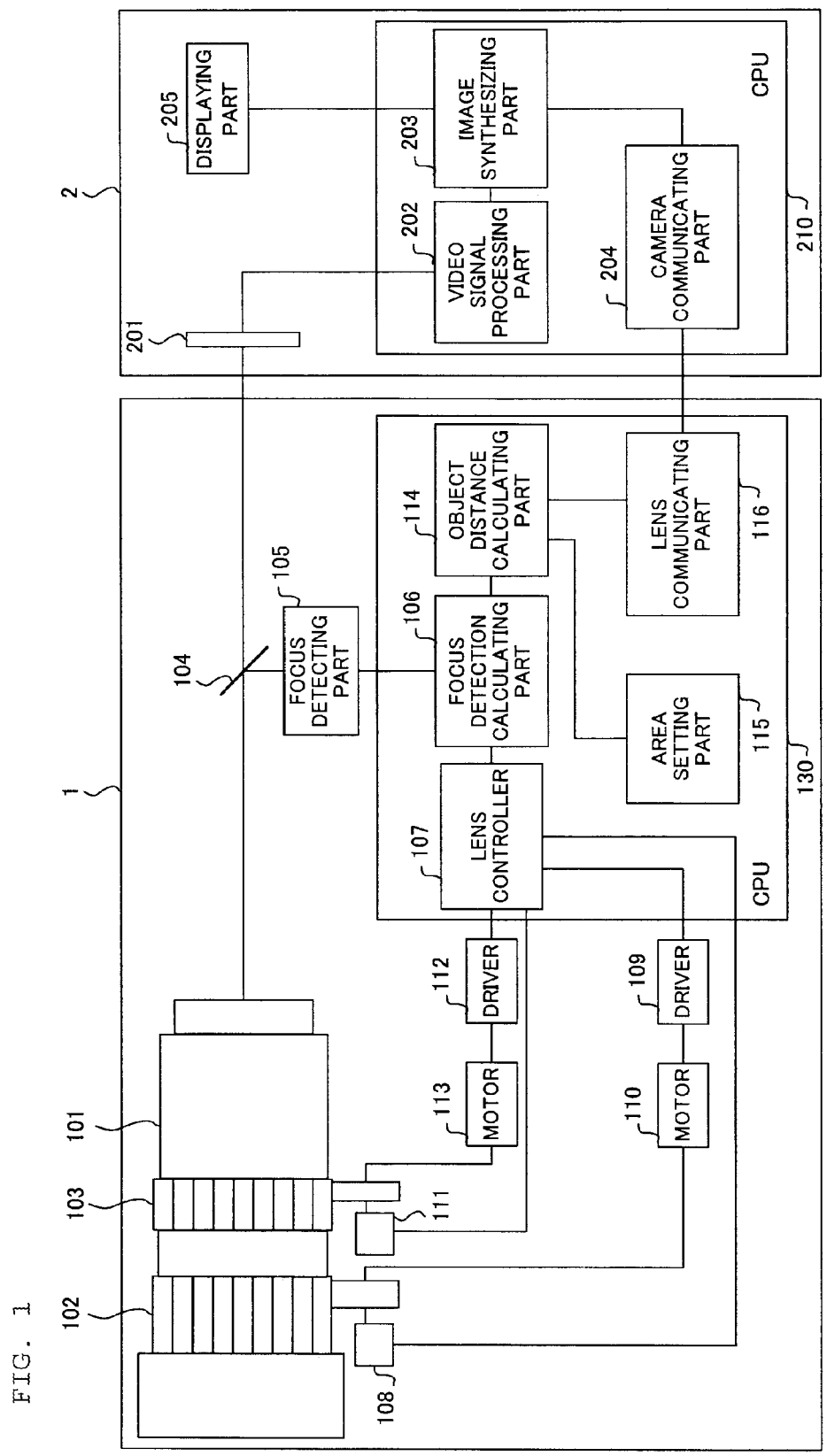
FIG. 1 is a block diagram showing a configuration of an image pickup system that is a first example (Example 1) of the present invention.

FIG. 1 shows the configuration of an image pickup system that is Example 1 of the present invention. The image pickup system is constituted by a lens apparatus 1 and a video camera 2. The lens apparatus 1 is an interchangeable lens which is detachably attached to the camera 2.

In the camera 2, reference numeral 201 denotes an image pickup element (hereinafter referred to as "CCD") constituted by a CCD sensor or a CMOS sensor.

In the lens apparatus 1, reference numeral 101 denotes a lens barrel 101 which houses an optical system (not shown) including optical adjusting members such as a focus lens, a magnification-varying lens (zoom lens) and an iris (aperture stop). The optical system is a so-called front focus type optical system in which the focus lens is disposed closest to an object among the optical adjusting members.

The lens barrel 101 is provided with a focus drive ring 102 which transmits driving force from a focus motor 110 to the focus lens to move it in an optical axis direction. The lens barrel 101 is also provided with a zoom drive ring 103 which transmits driving force from a zoom motor 113 to the magnification-varying lens to move it in the optical axis direction.

In the lens apparatus 1, a half mirror 104 is provided behind the lens barrel 101 (that is, closer to an image plane). A light flux from the object enters and passes through the lens apparatus 1, and then reaches the half mirror 104. The light flux is divided into a light flux transmitted through the half mirror 104 and a light flux reflected thereby.

The light flux transmitted through the half mirror 104 enters the CCD 201. The light flux reflected by the half mirror 104 enters a focus detecting part 105 which is disposed in the lens apparatus 1 at a position conjugate with the CCD 201.

Figure 2:
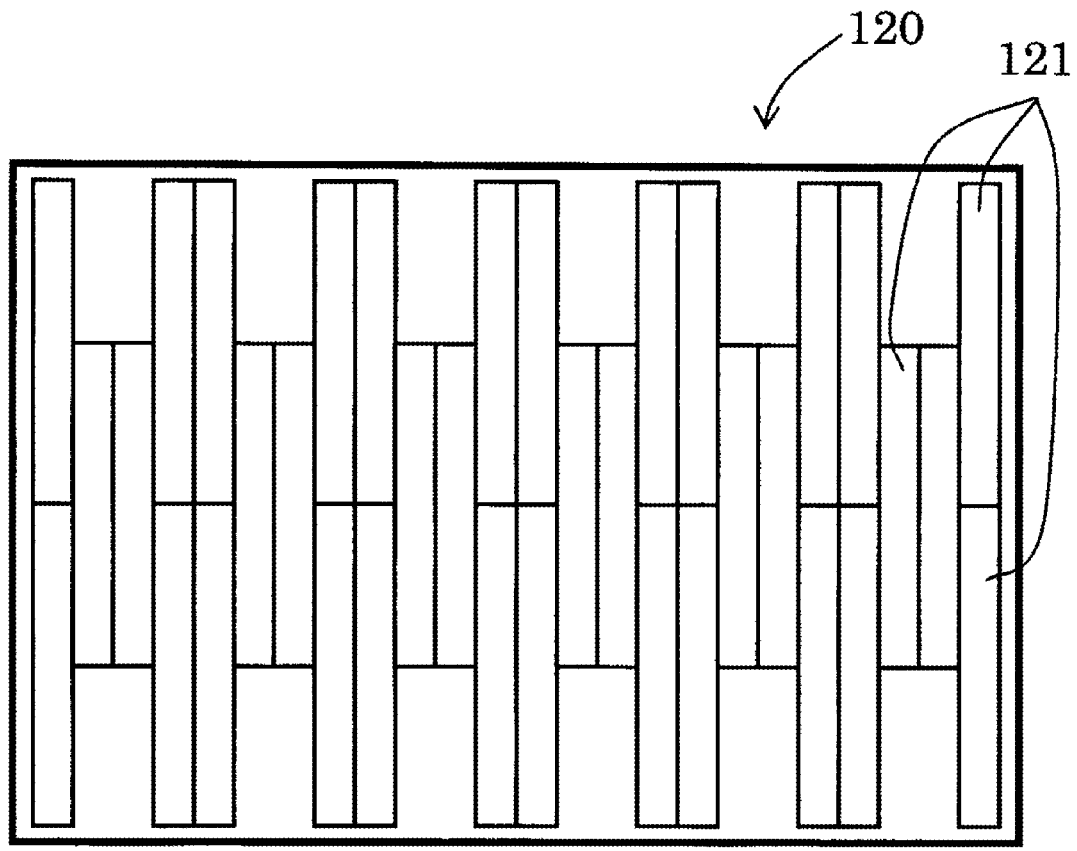
FIG. 2 shows a configuration of an AF sensor in Example 1.

The focus detecting part 105, which corresponds to a ranging sensor or a distance information detector, includes plural pairs of secondary image-forming lenses (not shown) and an AF sensor (optical sensor) 120 shown in FIG. 2 which is a phase difference detector detecting a phase difference. The AF sensor 120 is provided with plural pairs of line sensors (linearly-arranged photoelectric conversion elements) 121.

The focus detecting part 105 corresponding to a ranging sensor or a distance information detector can simultaneously detect focus states in plural focus detection areas, which correspond to ranging areas or distance measuring areas, set in an image pickup area. The focus state means the phase difference or distance information. The focus detection area is hereinafter referred to as "ranging area".

On each pair of the line sensors 121, a pair of object images (hereinafter referred to as "two images") is formed with light reflected by the half mirror 104 and then divided into two by a pair of the secondary image-forming lenses. The each pair of the line sensors 121 photoelectrically converts the two images to output two image signals. The above-mentioned two images, in other words, the two image signals have a phase difference corresponding to the focus state of the lens apparatus 1 (optical system).

When the lens apparatus 1 is in an in-focus state, the phase difference corresponding to a distance between the two images (object images) has a specific value. When the lens apparatus 1 is in a so-called front focus state, the phase difference has a value smaller than the specific value. The "front focus state" shows a state in which a focal point of a lens (lens apparatus) is in front of the object. When the lens apparatus 1 is in a so-called rear focus state, the phase difference has a value larger than the specific value. The "rear focus state" shows a state in which a focal point of a lens (lens apparatus) is behind the object. Thus, the focus detecting part 105 (AF sensor 120) has a function of detecting the phase difference between the two images (object images) formed with the light entering the lens apparatus 1.

The two image signals from each pair of the line sensors 121 are input to the focus detection calculating part 106. The focus detection calculating part 106 performs correlation calculation for the two image signals to obtain the phase difference therebetween, and then calculates a defocus amount of the lens apparatus 1 based on the phase difference. Thus, plural defocus amounts are calculated based on the plural pairs of the image signals from the plural pairs of the line sensors 121 provided in the AF sensor 120. The calculated plural defocus amounts are input to a lens controller (focus controller) 107 and an object distance calculating part (distance information generator) 114.

In the lens apparatus 1 in this example, after a user performs manual focus for an object, the manual focus being described later, AF (auto focus) is performed to focus the lens apparatus 1 on the object more accurately. Therefore, the lens controller 107 selects a smallest defocus amount as a defocus amount for AF among the plural input defocus amounts.

An AF area (focus detection area) on which the user intends to focus the lens apparatus 1 in the image pickup area may be selected arbitrarily by a user's operation of an operation member such as a cross key. In this case, a defocus amount obtained by using a pair of the line sensors including in the selected AF area is used as the defocus amount for AF.

Moreover, the lens controller 107 detects a rotational position of the focus drive ring 102, that is, a position of the focus lens through a focus position detector 108. Further, the lens controller 107 detects a rotational position of the zoom drive ring 103, that is, a position of the magnification-varying lens through a zoom position detector 111.

The lens controller 107 then calculates a movement amount of the focus lens based on the detected positions of the focus lens and the magnification-varying lens and the defocus amount for AF. The calculated movement amount is a movement amount of the focus lens to obtain an in-focus state for an object whose two images are formed on a pair of the line sensors outputting the image signals used in calculation of the defocus amount for AF.

Then, the lens controller 107 drives a focus motor 110 through a focus driver 109 such that the focus lens is moved in the optical axis direction by the calculated movement amount, which rotates the focus drive ring 102. Thus, the AF is performed.

In the lens apparatus 1 in this example, a focus command signal from a focus operation member such as a focus switch, not shown, which is operated by the user is input to the lens controller 107. The lens controller 107 drives, in response to the focus command signal, the focus motor 110 through the focus driver 109 to rotate the focus drive ring 102. Thus, manual focus by servo control is performed.

Further, a zoom command signal from a zoom operation member such as a zoom switch, not shown, which is operated by the user is input to the lens controller 107. The lens controller 107 drives, in response to the zoom command signal, the zoom motor 113 through the zoom driver 112 to rotate the zoom drive ring 103. Thus, the magnification-varying lens is moved, and thereby manual zoom by servo control is performed.

An area setting part (ranging position outputting part) 115 stores and holds predetermined positions (coordinates) of the plural ranging areas set in the image pickup area (image pickup frame) where the camera 2 can capture an image through the lens apparatus 1, and shapes (sizes) of the ranging areas.

Figure 3:
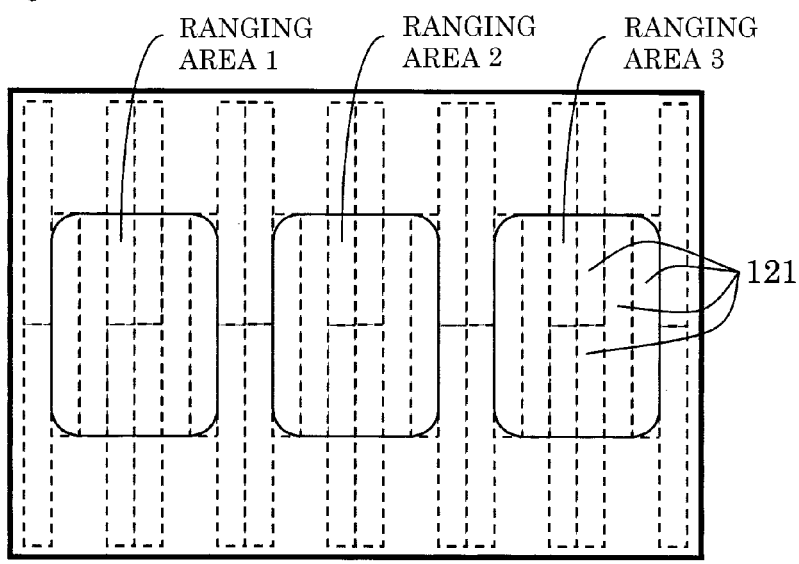
FIG. 3 shows an example of setting ranging areas in Example 1.

FIG. 3 shows an example of setting the ranging areas in the image pickup area. FIG. 3 shows an example in which three ranging areas 1 to 3 are respectively arranged at a right side, a center and a left side in the image pickup area. The coordinates of the ranging areas 1 to 3 are held in advance in the area setting part 115. Changing the held contents in the area setting part 115 enables a change of at least one of the positions, the sizes and the number of the ranging areas (see Example 2). Therefore, a lot of line sensors 121 are arranged in the AF sensor 120 shown in FIG. 2 such that the user can freely select the positions, the sizes and the number of the ranging areas in the image pickup area.

Each ranging area is set so as to include plural pairs of the line sensors 121. In FIG. 3, the line sensors 121 shown in FIG. 2 are shown by dotted lines. The setting example shown in FIG. 3 is suitable for, for example, a case of detecting distances to two or three objects (runners) in a live marathon telecast.

The plural defocus amounts simultaneously detected using the plural pairs of the line sensors 121 in the AF sensor 120 are input from the focus detection calculating part 106 to the object distance calculating part 114. The object distance calculating part 114 calculates as follows a distance to an object in each ranging area based on the defocus amount obtained using a pair of the line sensors 121 selected from the plural pairs of the line sensors 121 included in each ranging area. Hereinafter, the distance to the object is referred to as "object distance". The "object distance" herein means a distance from the camera 2 (or an image pickup surface of the CCD 201) or the lens apparatus 1 (or a lens surface closest to the object) to the object. A method of selecting the "pair of the line sensors 121" will be described later.

The object distance calculating part 114 takes the defocus amounts in the respective ranging areas, a current position of the focus lens (hereinafter referred to as "current focus lens position") detected by the focus position detector 108 and a current position of the magnification-varying lens (hereinafter referred to as "current zoom lens position") detected by the zoom position detector 111.

Then, the object distance calculating part 114 calculates for each ranging area a position of the focus lens (hereinafter referred to as "in-focus focus lens position") where an in-focus state for an object included in the ranging area is obtained, based on the defocus amount and the current focus lens position. Further, the object distance calculating part 114 calculates the object distance in each ranging area based on the in-focus focus lens position and the current zoom lens position.

In FIG. 1, lines connecting the object distance calculating part 114 to the focus position detector 108 and the zoom position detector 111 are omitted.

The object distance calculating part 114 is connected to a lens communicating part 116. The lens communicating part 116 communicates with a camera communicating part 204 provided in the camera 2 so as to send and receive data by serial communication. The lens communicating part 116 sends information on the object distance (distance information or part thereof) calculated in each ranging area and information on the coordinates of each ranging area held in the area setting part 115 (position information) to the camera communicating part 204.

The focus detection calculating part 106, the lens controller 107, the object distance calculating part 114, the area setting part 115 and the lens communicating part 116 are provided in a lens CPU 130.

In the camera 2, a signal output from the CCD 201 is input to a video signal processing part 202. The video signal processing part 202 performs various processing on the signal input from the CCD 201 to generate a captured image signal (captured image). The captured image signal is output to an image synthesizing part 203 that is an output image generator.

The image synthesizing part 203 receives the information on the object distances in the ranging areas and the information on the coordinates of the ranging areas which are input from the lens apparatus 1 through the camera communicating part 204. The image synthesizing part 203 synthesizes the information on the object distances with the captured image signal to generate an output video signal (output image). Specifically, the image synthesizing part 203 generates an output image in which the information on the object distances is superimposed on the captured image at positions therein corresponding to the information on the coordinates of the ranging areas. The output video signal is output to a displaying part 205 or an outside.

Figure 4:
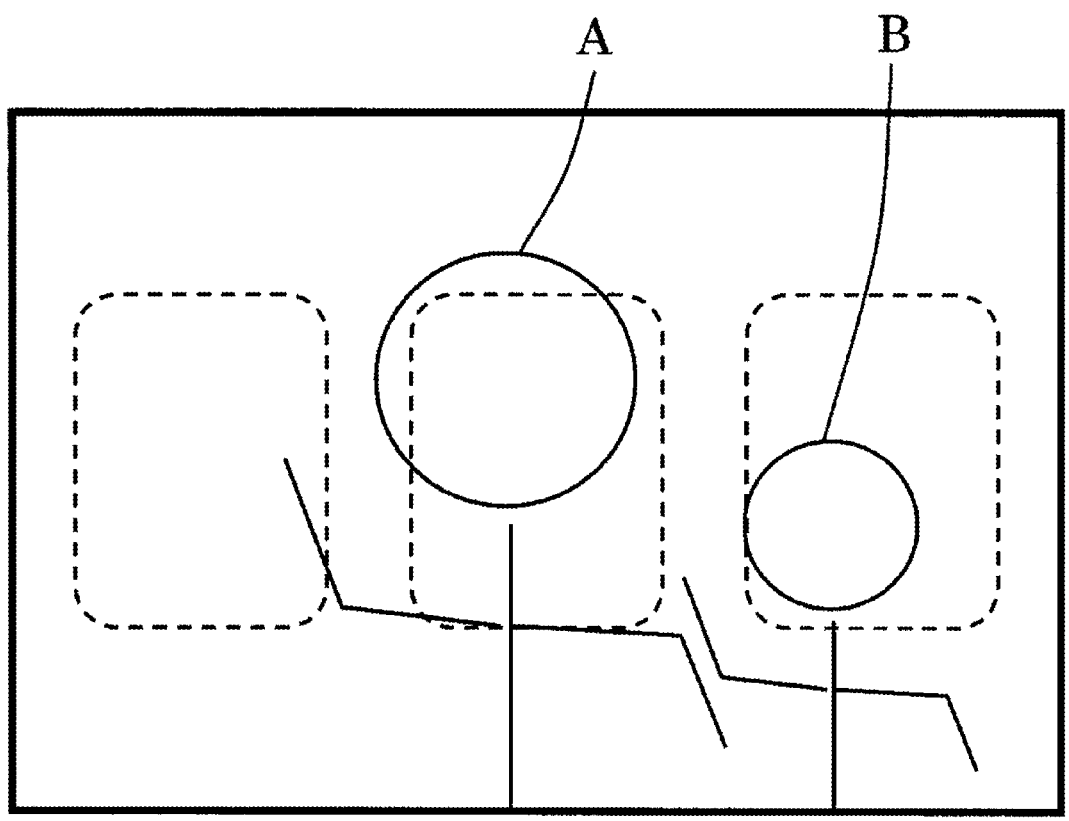
FIG. 4 shows an example of a captured image in Example 1.

FIG. 4 shows an output image obtained by image pickup of a marathon in a state where the ranging areas 1 to 3 shown in FIG. 3 (shown by dotted lines in FIG. 4) are set in the image pickup area. The output image is a bust-shot image of two runners A and B (hereinafter respectively referred to as "first object" and "second object"). The first object A is included in the ranging area 2, and the second object B is included in the ranging area 3. A distance to the first object A can be calculated in the ranging area 2, and a distance to the second object B can be calculated in the ranging area 3. In addition, a distance to a background (not shown) can be calculated in the ranging area 1.

The video signal processing part 202, the image synthesizing part 203 and the camera communicating part 204 are provided in a camera CPU 210.

Figure 5:
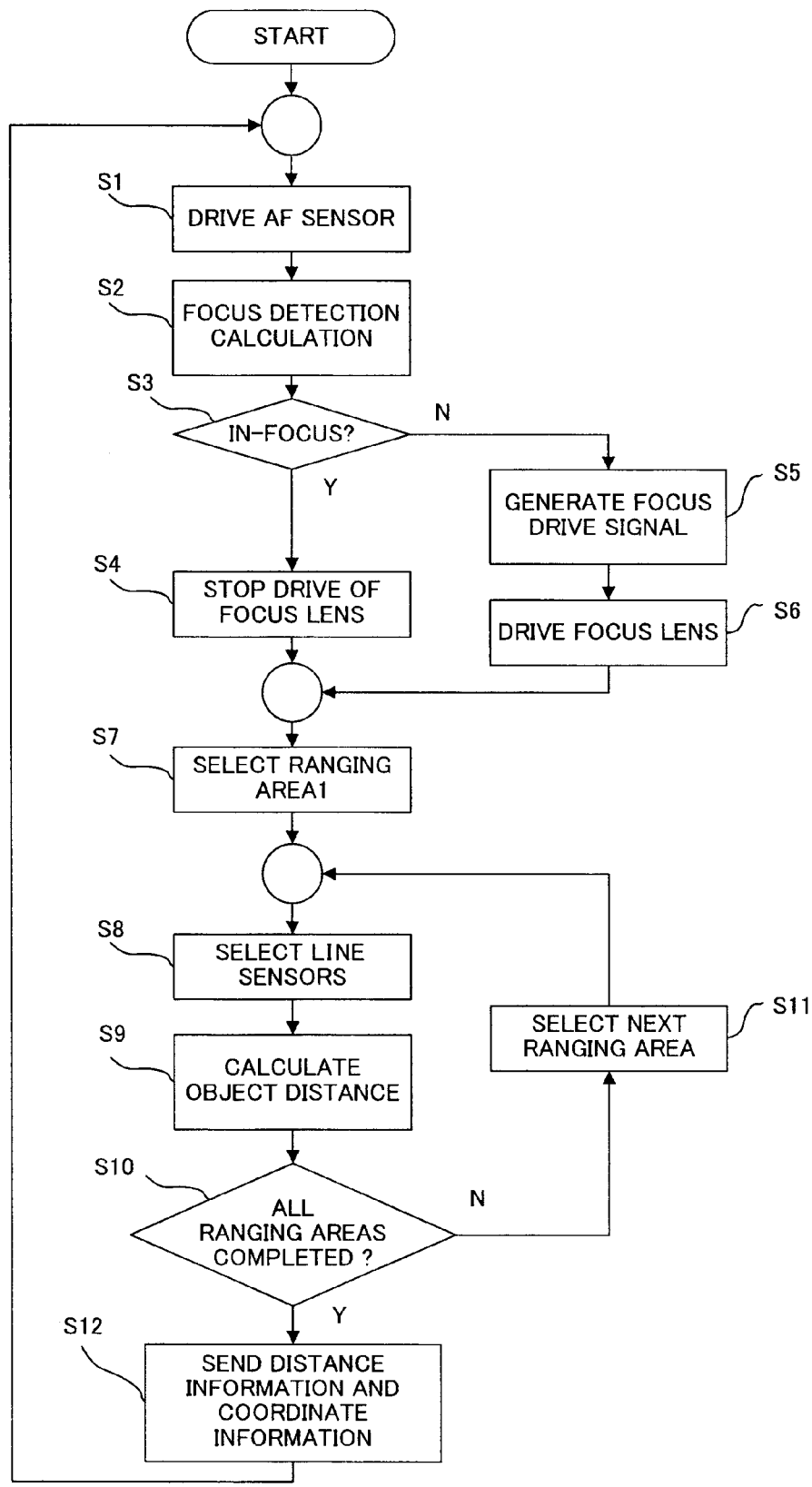
FIG. 5 is a flowchart showing AF processing and object distance calculation processing in Example 1.

FIG. 5 shows a flowchart of AF processing and object distance calculation processing which are performed in the lens apparatus 1. The lens CPU 130 controls the AF processing and the object distance calculation processing according to a computer program stored in a memory (not shown).

When power of the lens apparatus 1 is turned on, the lens CPU 130 proceeds to step S1 to drive the AF sensor 120 in the focus detecting part 105. Then, at step S2, the focus detection calculating part 106 performs a focus detection operation, that is, calculation of the defocus amounts in the ranging areas based on the phase differences obtained by the respective pairs of the line sensors 121. Then, the lens controller 107 selects the smallest defocus amount among the defocus amounts input from the focus detection calculating part 106 as the defocus amount for AF.

Next, at step S3, the lens controller 107 confirms a current focus lens position through the focus position detector 108 and determines whether or not the defocus amount for AF is within an in-focus range. If the defocus amount for AF is within the in-focus range, the lens controller 107 regards a focus state of the lens apparatus 1 as an in-focus state to proceed to step S4. At step S4, the lens controller 107 stops drive of the focus lens. Then, the lens CPU 130 proceeds to step S7.

On the other hand, if the defocus amount for AF is not within the in-focus range, the lens controller 107 proceeds to step S5 to calculate the in-focus focus lens position based on the defocus amount for AF and the current focus lens position. In the example shown in FIG. 4, the in-focus focus lens position for the first object A is calculated. Further, the lens controller 107 generates a focus drive signal which is provided to the focus driver 109 to move the focus lens to the in-focus focus lens position.

Next, at step S6, the lens controller 107 outputs the focus drive signal to the focus driver 109. This activates the focus motor 110 to rotate the focus drive ring 102, and thereby the focus lens is moved to the in-focus focus lens position. Thus, an in-focus state of the lens apparatus 1 for the first object A shown in FIG. 4 can be obtained. Then, the lens CPU 130 proceeds to step S7.

At step S7, the object distance calculating part 114 first selects the ranging area 1 among the ranging areas 1 to 3 shown in FIG. 3.

Next, at step S8, the object distance calculating part 114 selects a pair of the line sensors used for object distance calculation from the plural pairs of the line sensors 121 included in the selected ranging area. Specifically, the object distance calculating part 114 performs correlation calculation for obtaining a degree of coincidence between two image signals output from each pair of the line sensors 121, and then selects a pair of the line sensors outputting two image signals whose degree of coincidence is the highest as a pair of the line sensors for ranging.

At step S9, the object distance calculating part 114 calculates the object distance in the selected ranging area by using the defocus amount obtained based on the phase difference of the two image signals output from the pair of the line sensors for ranging, the current focus lens position and the current zoom lens position.

At step S10, the object distance calculating part 114 determines whether or not the object distance calculation for all the ranging areas 1 to 3 has been finished. If the object distance calculation for all the ranging areas 1 to 3 has not been finished yet, the object distance calculating part 114 proceeds to step S11 to select the next ranging area and repeats the processes at steps S8 to S10. If the object distance calculation for all the ranging areas 1 to 3 has been finished, the object distance calculating part 114 proceeds to step S12.

At step S12, the object distance calculating part 114 sends the information on the object distance in each ranging area and the information on the coordinates of each ranging area held in the area setting part 115 to the camera 2. When the sending has been completed, the lens CPU 130 repeats the processes from step S1.

Figure 6:
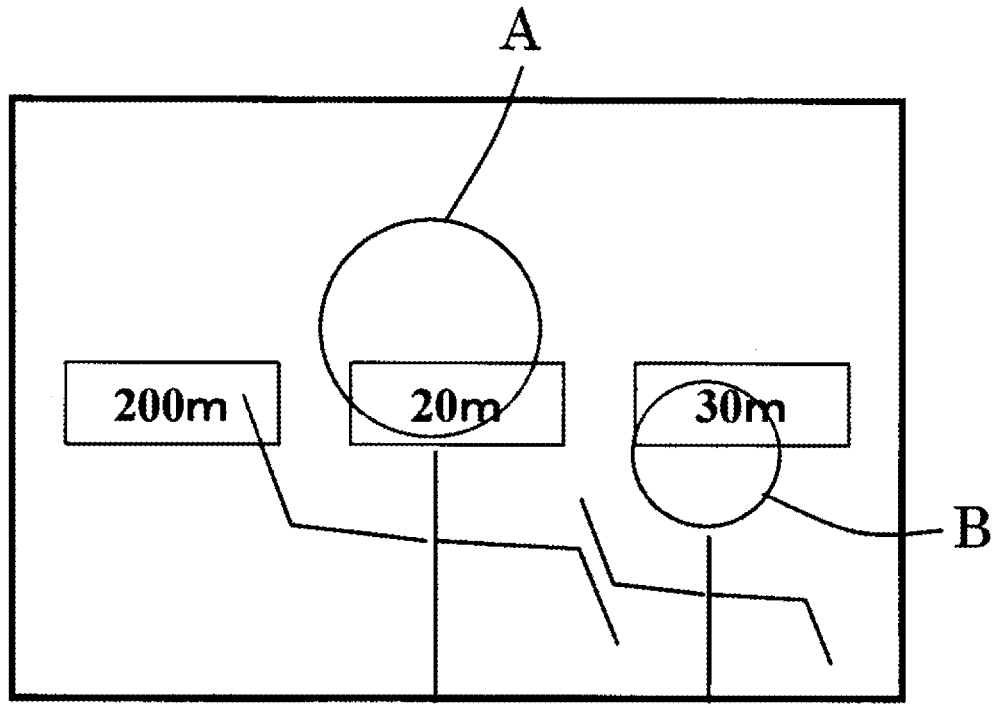
FIG. 6 shows an example of displaying distance information in Example 1.

FIG. 6 shows an output image generated by the image synthesizing part 203 of the camera 2 that receives the information on the object distance in each ranging area and the information on the coordinates of each ranging area.

The output image is displayed in the displaying part 205 or output to the outside to be broadcast. This also applies to other examples described below.

In the output image, an in-focus state for the first object A is obtained by AF.

In the output image, characters "20 m", "30 m" and "200 m" showing the object distances (distance information) are superimposed and displayed on the captured image at positions corresponding to the coordinates of the ranging areas 2, 3 and 1 (that is, positions determined according to the coordinate information) which respectively include the first object A, the second object B and the background (object) not shown.

Thus, in this example, in the state where the in-focus state for the first object A is obtained, the object distances of the first and second objects A and B can be calculated and displayed with the captured image in a superimposed manner. In other words, even if focusing (manual focus and AF) is not performed for the second object B (in further other words, even if focusing is not performed for the first object A and the second object B respectively), the object distances of the first and second objects A and B can be calculated. Therefore, even if the distances to plural objects change every second in a live marathon telecast, the object distances of the plural objects can be displayed with the captured image with little or no delay to the change.

This example described the case where, when each ranging area includes plural pair of line sensors, a pair of line sensors outputting two image signals whose degree of coincidence is the highest is selected and an object distance is calculated using a phase difference obtained using the selected pair of line sensors. However, the method for calculating the object distance is not limited thereto.

For example, a method may be used in which plural object distances are calculated based on phase differences obtained using plural pairs of line sensors in each ranging area, and an average value of the calculated object distances is determined as an object distance in the ranging area. Moreover, another method may be used in which plural object distances obtained using plural pairs of line sensors in each ranging area are weighted according to positions of the line sensors, and one object distance is selected or generated from the weighted object distances according to a predetermined rule.

EXAMPLE 2

Description will be made of Example 2 of the present invention with reference to FIGS. 7 to 10.

In this example, the settings (positions, sizes and number) of the ranging areas can be switched. Although Example 1 described an example of capturing a bust-shot image of two runners in a live marathon telecast, this example will describe an example of capturing a full-body image of runners. However, three large ranging areas set as shown in FIG. 3 in Example 1 may make it impossible to calculate an accurate object distance to each runner because two or more runners are included in one ranging area or a ratio of the runner occupying each ranging area is reduced.

Figure 7:
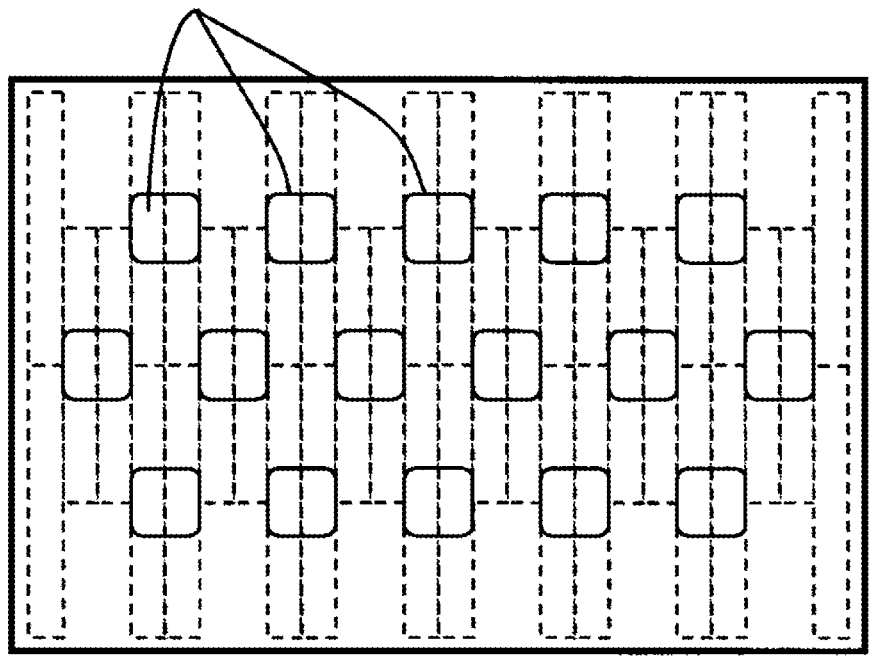
FIG. 7 shows an example of setting ranging areas in an image pickup system that is a second example (Example 2) of the present invention.

Therefore, in this example, the area setting part 115 holds two ranging area arrangement patterns in which settings (positions and sizes) of the ranging areas are mutually different to allow the setting of the ranging areas shown in FIG. 7 in addition to the setting of the ranging areas shown in FIG. 3. FIG. 7 shows an arrangement of sixteen ranging areas including five ranging areas horizontally lined up in an upper part of the image pickup area, five ranging areas horizontally lined up in a lower part thereof and six ranging areas horizontally lined up in a vertically central part thereof. The setting of the ranging areas shown in FIG. 7 is suitable for capturing a wide-shot image including whole bodies of two or more runners in a live marathon telecast or the like.

Figure 8:
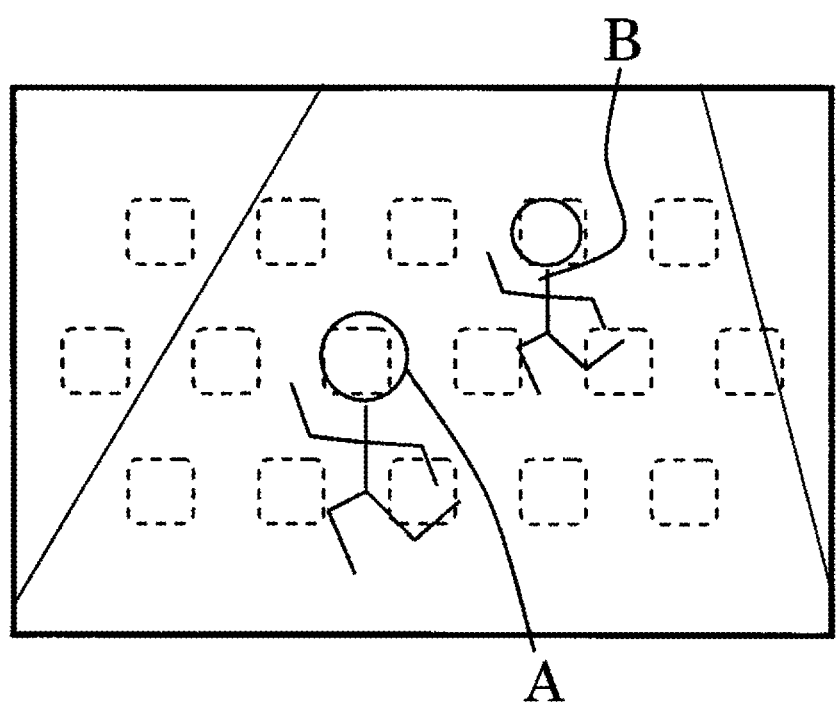
FIG. 8 shows an example of a captured image in Example 2.

FIG. 8 shows an output image obtained by image pickup of a marathon in a state where the ranging areas shown in FIG. 7 (shown by dotted lines in FIG. 8) are set. The output image is a wide-shot image including whole bodies of two runners A and B (hereinafter respectively referred to as "first object" and "second object"). The arrangement of the line sensors on the AF sensor 120 in this example is the same as that in Example 1 (FIG. 2).

Figure 9:
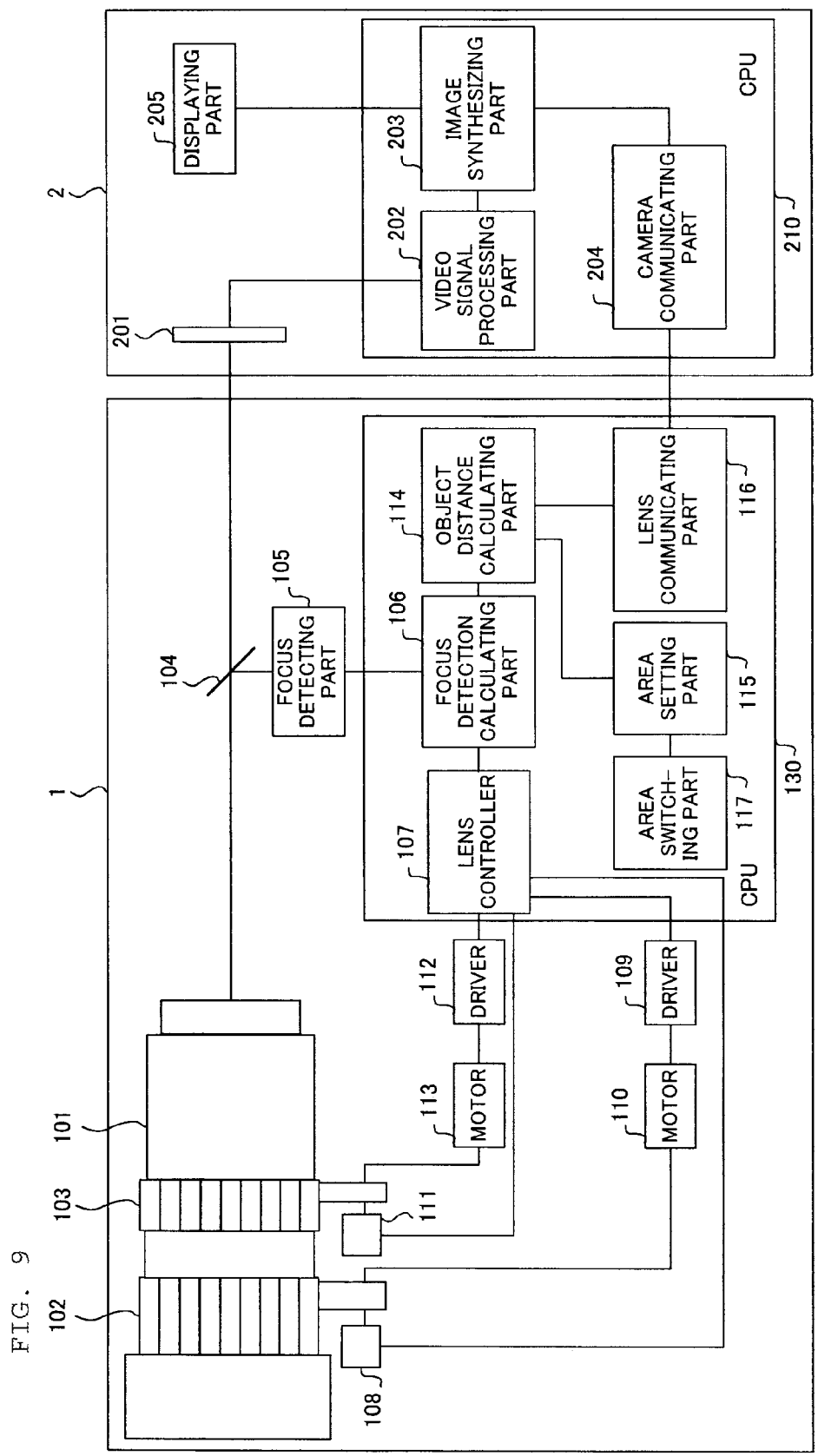
FIG. 9 is a block diagram showing a configuration of an image pickup system of Example 2.

FIG. 9 shows a configuration of an image pickup system of this example. Components in this example identical to or having basically similar functions as those in Example 1 are denoted with the same reference numerals as those in Example 1, and their descriptions are omitted.

Reference numeral 117 denotes an area switching part 117 (ranging area changer) provided in the lens CPU 130. The area switching part 117 selects one of the two ranging area arrangement patterns held in the area setting part 115 in response to a user's operation of a ranging area switch (not shown). The area setting part 115 sets the ranging areas corresponding to the selected ranging area arrangement pattern. The object distance calculating part 114 calculates the object distances in the three ranging areas shown in FIG. 3 and many ranging areas shown in FIG. 7.

Figure 10:
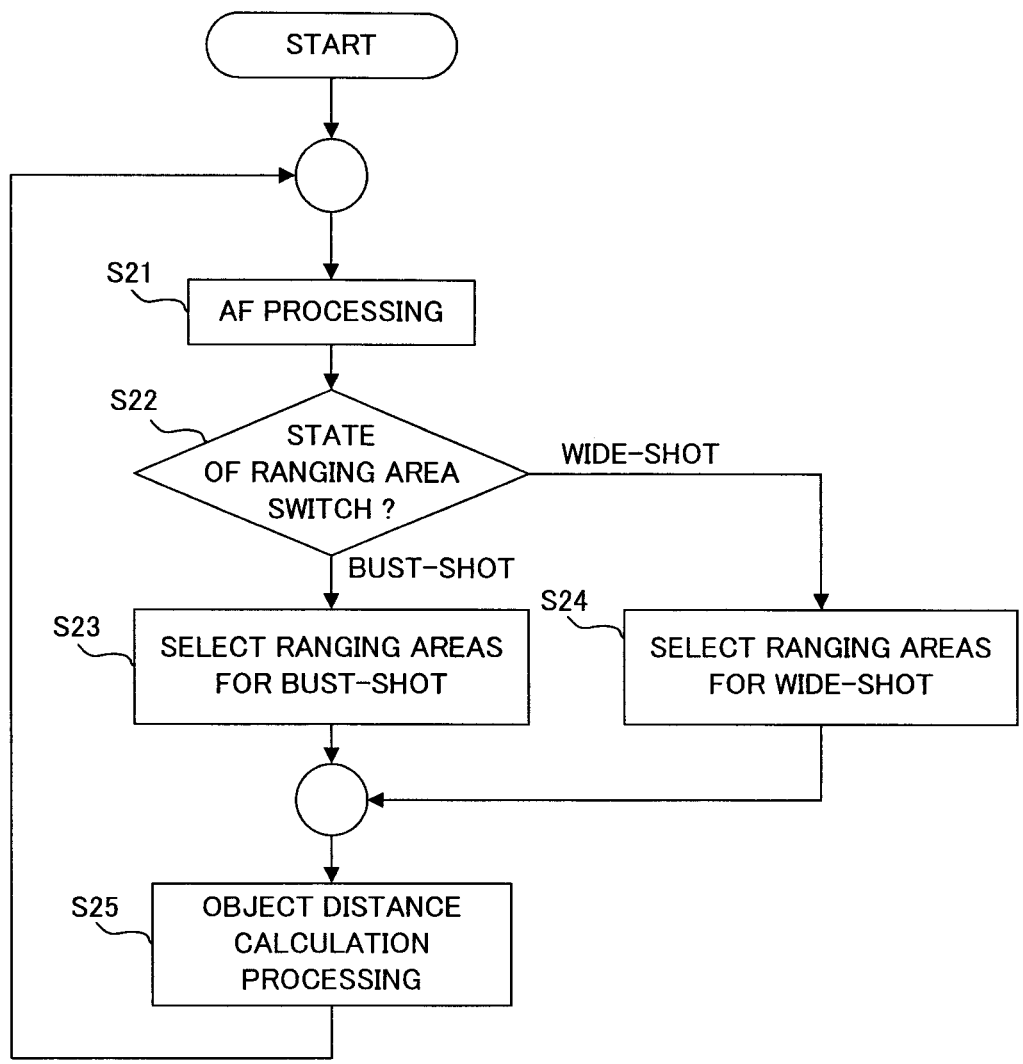
FIG. 10 is a flowchart showing AF processing and object distance calculation processing in Example 2.

FIG. 10 shows a flowchart of AF processing and object distance calculation processing which are performed in the lens apparatus 1. The lens CPU 130 controls the AF processing and the object distance calculation processing according to a computer program stored in a memory (not shown).

At step S21, the lens CPU 130 performs the AF processing which is the same as that performed at steps S1 to S6 shown in FIG. 5 in Example 1.

At step S22, the lens CPU 130 reads a state of the ranging area switch. If the ranging area setting suitable for capturing the bust-shot image is selected with the ranging area switch, the lens CPU 130 proceeds to step S23 to set the ranging areas shown in FIG. 3. If the ranging area setting suitable for capturing the wide-shot image is selected, the lens CPU 130 proceeds to step S24 to set the ranging areas shown in FIG. 7.

Next, at step S25, the lens CPU 130 performs in each ranging area the object distance calculation processing which is the same as that performed at steps S7 to S12 shown in FIG. 5 in Example 1, and then sends information on the object distance in each ranging area and information of the coordinates of each ranging area to the camera 2. When the sending has been completed, the lens CPU 130 repeats the processes from step S1.

Figure 11:
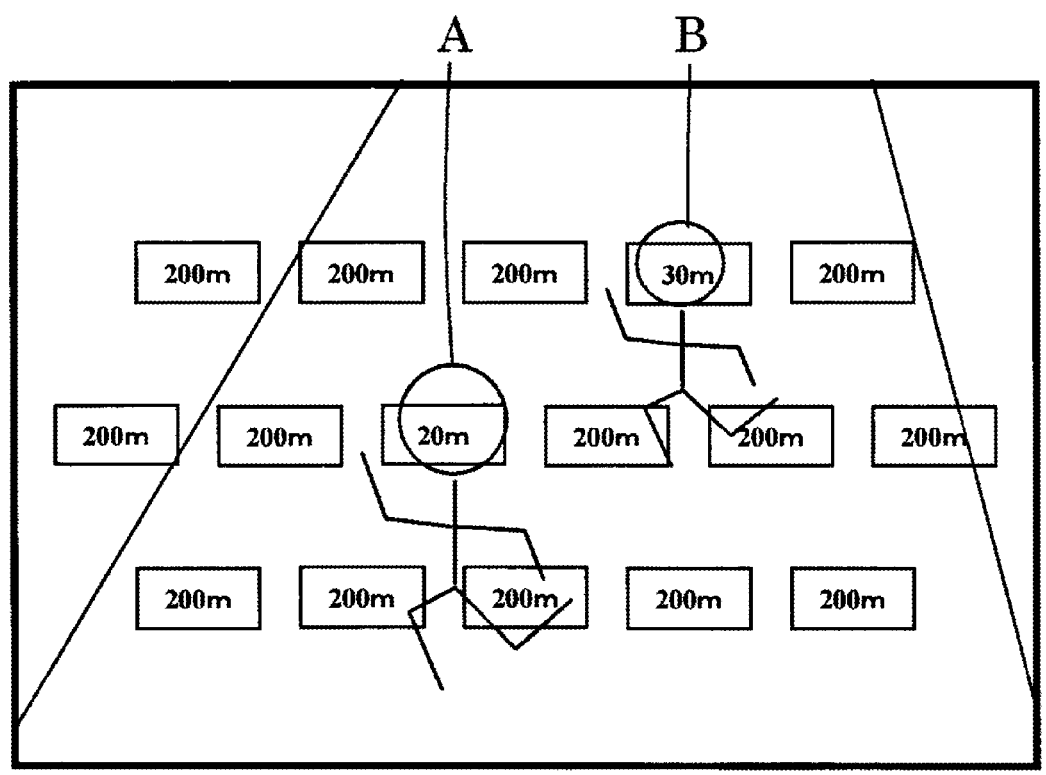
FIG. 11 shows an example of displaying distance information in Example 2.

FIG. 11 shows an output image generated by the image synthesizing part 203 of the camera 2 that receives the information on the object distance in each ranging area and the information on the coordinates of each ranging area. In the output image, an in-focus state for the first object A is obtained by the AF.

In the output image, characters showing the object distances (distance information) are superimposed and displayed on the captured image including the first object A, the second object B and a background (object), not shown, at positions corresponding to the coordinates of the ranging areas.

Thus, also in this example, in the state where the in-focus state for the first object A is obtained (that is, even if focusing is not performed for the first object A and the second object B respectively), the object distances of the first and second objects A and B can be calculated and displayed in a superimposed manner on the captured image. Therefore, even if the distances to plural objects change every second in a live marathon telecast, the object distances can be displayed with the captured image with little or no delay to the change.

Moreover, this example enables selection between the ranging area setting suitable for capturing the bust-shot image and the ranging area setting suitable for capturing the wide-shot image through an operation of the ranging area switch.

Although this example described the case where two ranging area settings can be selected, three or more ranging area settings may be selected. Moreover, the ranging area settings shown in FIGS. 3 and 7 are merely examples, so that other ranging area settings may be employed.

Moreover, although this example described the case where the ranging area setting is changed in response to a user's operation of the ranging area switch, the ranging area setting may be automatically changed according to a zoom state (zoom lens position). For example, the ranging area setting may be automatically changed to one suitable for capturing the wide-shot image when the zoom state is a wide-angle state and to the other suitable for capturing the bust-shot image when the zoom state is a telephoto state.

EXAMPLE 3

Figure 12:
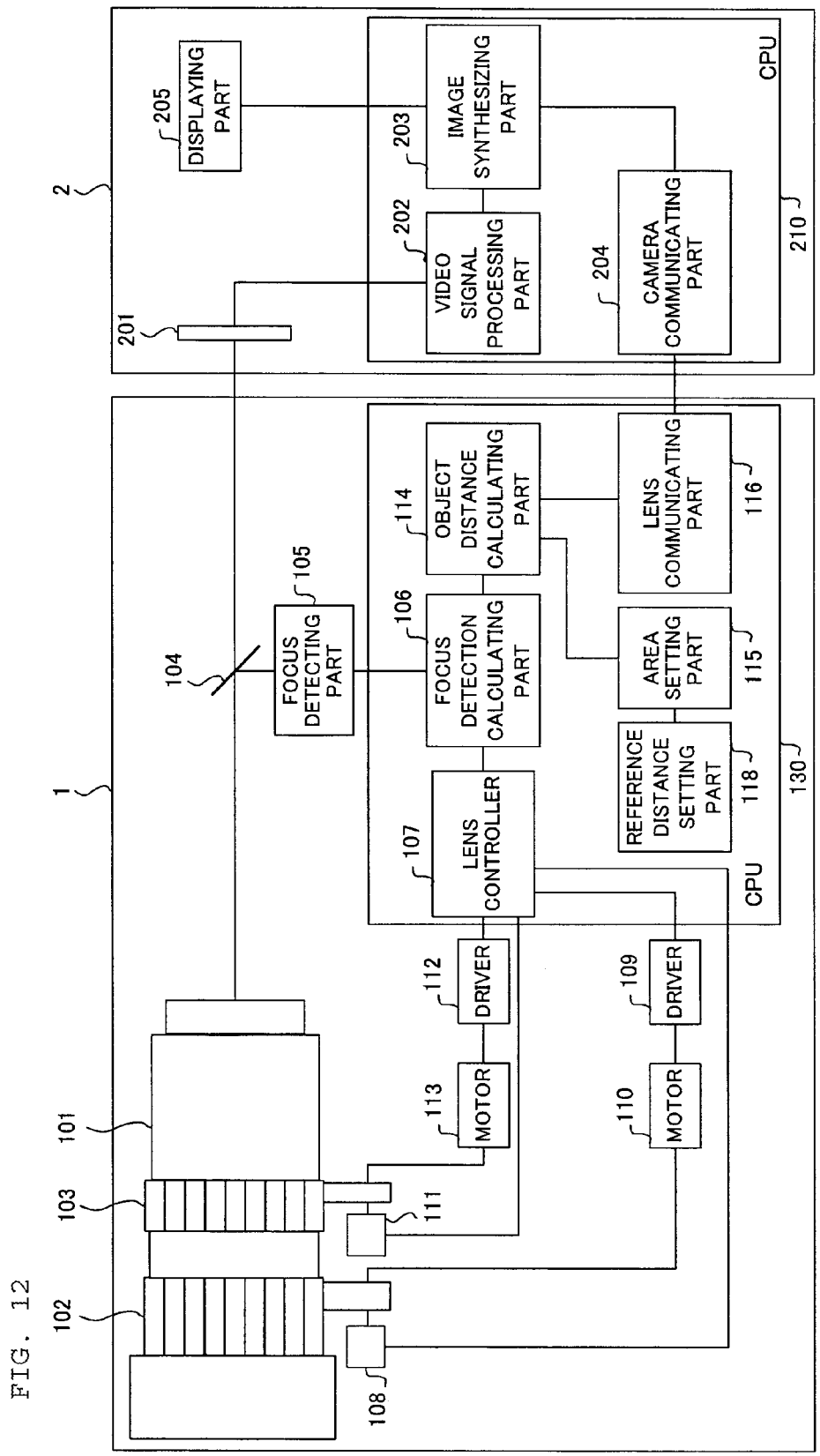
FIG. 12 is a block diagram showing a configuration of an image pickup system that is a third example (Example 3) of the present invention.

FIG. 12 shows a configuration of an image pickup system that is a third example (Example 3) of the present invention. Components in this example identical to or having basically similar functions as those in Example 1 (FIG. 1) are denoted with the same reference numerals as those in Example 1, and their descriptions are omitted.

Reference numeral 118 denotes a reference distance setting part provided in the lens CPU 130. The reference distance setting part 118 stores and holds one of the plural ranging areas set by the area setting part 115 as a reference ranging area in advance. The reference ranging area can be arbitrarily changed.

The object distance calculating part 114 calculates an object distance in the reference ranging area to define the calculated object distance as a reference distance. Further, the object distance calculating part 114 calculates differences between the reference distance and object distances calculated in other ranging areas, in other words, differences between the object distances as relative distances.

Figure 13:
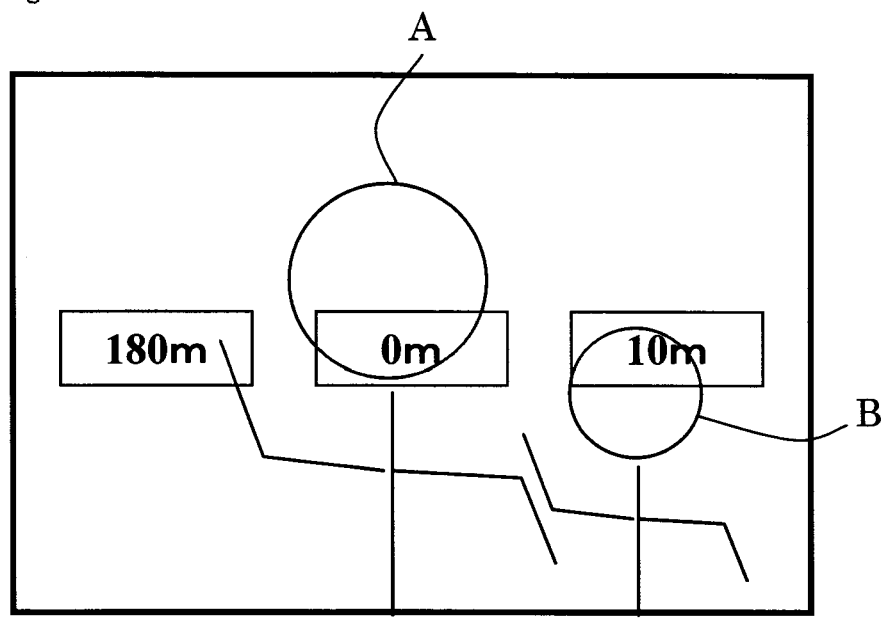
FIG. 13 shows an example of displaying distance information in Example 3.

FIG. 13 shows an example of displaying the relative distances (distance information) in the output image when the ranging area 2 among the ranging areas 1 to 3 shown in FIG. 3 in Example 1 is defined as the reference ranging area. The captured image of the output image is the same as that shown in FIG. 4 in Example 1, and the object distances of the first and second objects A and B are the same as those shown in FIG. 6.

The object distance of the first object A included in the ranging area 2 is the reference distance, so that "0 m" is displayed in the captured image at a position corresponding to the coordinates of the ranging area 2. On the other hand, a relative distance of "10 m", which is calculated by 30–20 m, of the second object B to the reference distance is displayed on the captured image at a position corresponding to the coordinates of the ranging area 3 including the second object B. Moreover, a relative distance of "180 m", which is calculated by 200–20 m, of a background to the reference distance is displayed on the captured image at a position corresponding to the coordinates of the ranging area 1 including the background. The characters "0 m", "10 m" and "180 m" shown in this FIG. 13 correspond to distance information.

According to this example, relative distances between plural objects included in plural ranging areas can be displayed with a captured image. Therefore, for example, in a live marathon telecast, it is possible to comprehensibly display a distance difference between a leading runner and a following runner.

Although this example described the case where the object distance calculated in one ranging area is defined as the reference distance and the difference between the reference distance and the object distance calculated in another ranging area is displayed, a distance arbitrarily set by a user may be defined as the reference distance. In this case, the differences of the object distances in all the ranging areas from the reference distance are displayed. Alternatively, an object distance corresponding to a current in-focus focus lens position may be defined as the reference distance.

EXAMPLE 4

Figure 14:
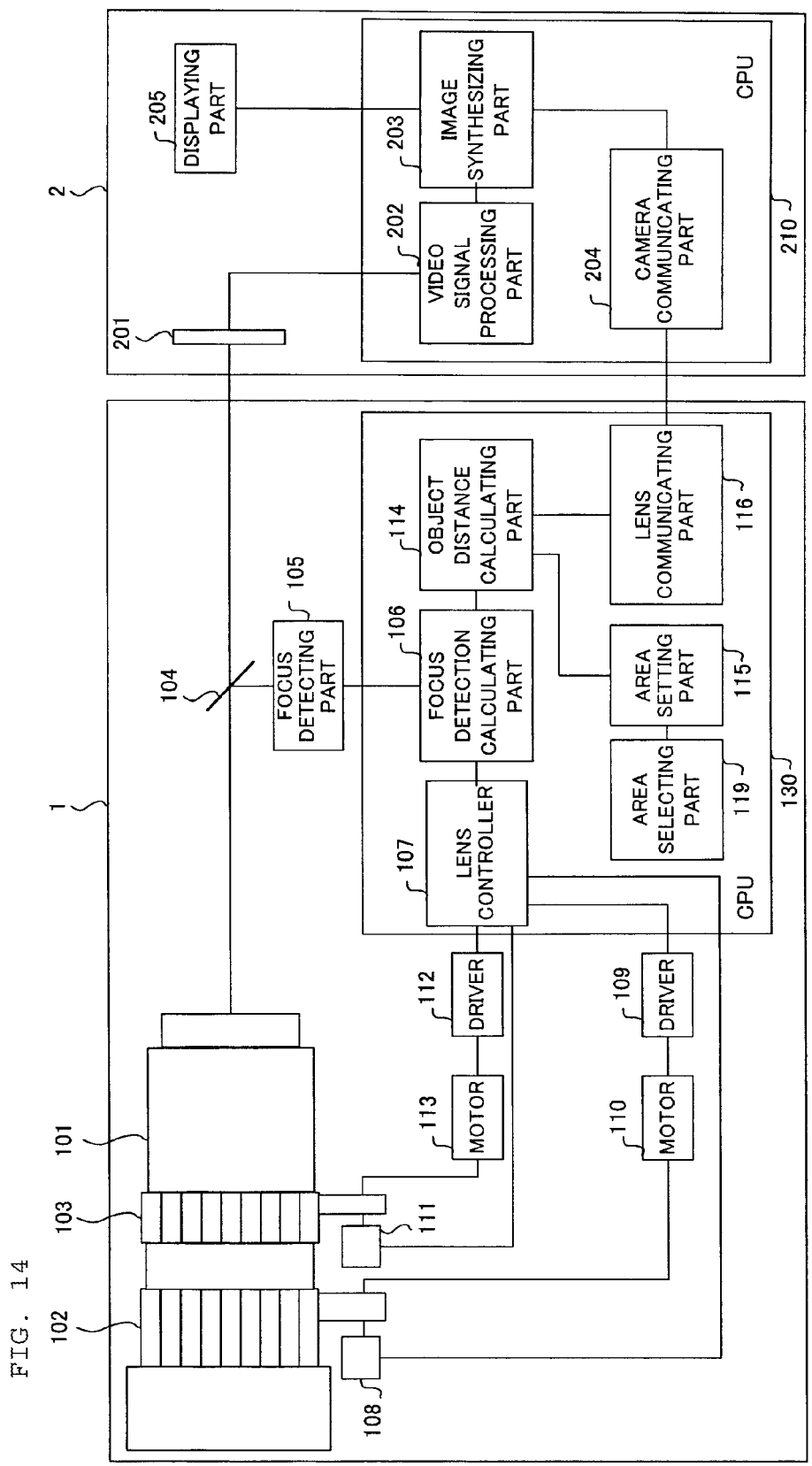
FIG. 14 is a block diagram showing a configuration of an image pickup system that is a fourth example (Example 4) of the present invention.

FIG. 14 shows a configuration of an image pickup system that is a fourth example (Example 4) of the present invention. Components in this example identical to or having basically similar functions as those in Example 1 (FIG. 1) are denoted with the same reference numerals as those in Example 1, and their descriptions are omitted.

Reference numeral 119 denotes an area selecting part provided in the lens CPU 130. The area selecting part 119 selects a first ranging area and a second ranging area from the plural ranging areas held in the area setting part 115. The first and second ranging areas can be arbitrarily changed through, for example, an operation member such as a cross key.

The object distance calculating part 114 calculates the object distances only in the first and second ranging areas selected by the area selecting part 119, and calculates a difference between the object distances calculated in the first and second ranging areas to send it to the camera 2. The difference between the object distances calculated in the first and second ranging areas corresponds to distance information. Further, the object distance calculating part 114 sends information on intermediate coordinates between the coordinates of the first ranging area and the coordinates of the second ranging area which are held in the area setting part 115 to the camera 2.

Figure 15:
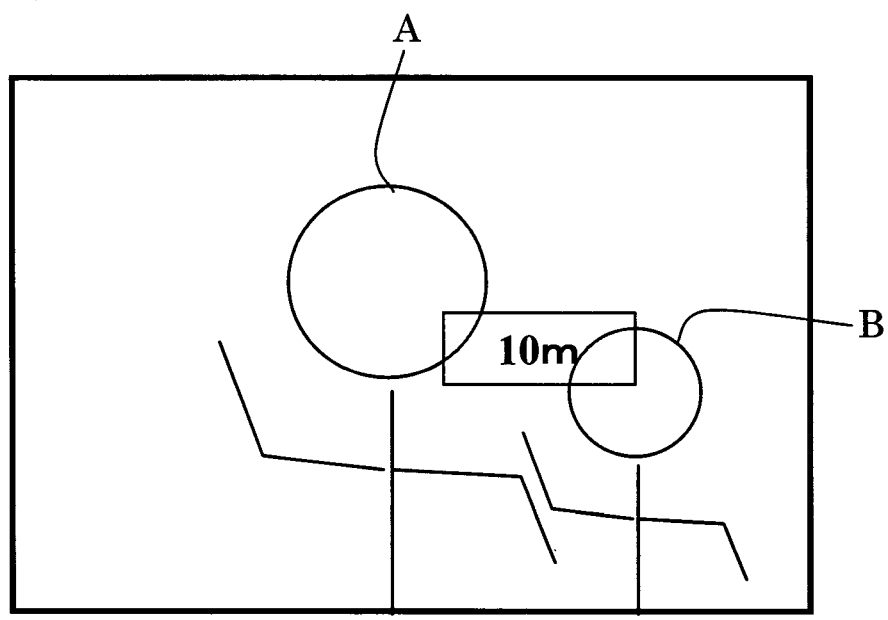
FIG. 15 shows an example of displaying distance information in Example 4.

FIG. 15 shows an example of displaying the distance information in the output image when the ranging area 2 among the ranging areas 1 to 3 shown in FIG. 3 in Example 1 is defined as the first ranging area and the ranging area 3 is defined as the second ranging area. The captured image of the output image is the same as that shown in FIG. 4. A relative distance (distance information) which is a difference between the object distance calculated in the ranging area 2 (first ranging area) including the first object A and the object distance calculated in the ranging area 3 (second ranging area) including the second object B is displayed in a superimposed manner on the captured image at an intermediate position between the ranging areas 2 and 3 (that is, a position determined based on the information on the coordinates of the first and second ranging areas).

According to this example, a difference between object distances calculated in two arbitrary ranging areas is displayed in a captured image at a position between positions corresponding to the two ranging areas. Therefore, for example, in a live marathon telecast, it is possible to display a distance difference between a leading runner and a following runner such that the distance difference display is not overlapped with the runners.

Although this example described the case where the relative distance is displayed at the position between the positions corresponding to the two ranging areas, the relative distance may be displayed at an arbitrary position.

Moreover, the relative distance between the objects described in this example and the object distances (from the camera 2, the lens apparatus 1, the image pickup surface of the image pickup element or a surface corresponding to the image pickup surface to the objects) described in Example 1 may be simultaneously or switchably displayed. In this example, the distance information superimposed and displayed on the captured image includes at least part of the above-mentioned relative distance or at least part of the object distance.

Furthermore, the present invention is not limited to these examples and various variations and modifications may be made without departing from the scope of the present invention.

For example, each of the above examples described the case where the AF is performed in the lens apparatus. However, even if only the manual focus is performed, plural object distances may be calculated using the AF sensor (phase difference detector), and an output image may be displayed which includes at least one of the plural object distances and the difference therebetween.

Moreover, each of the above examples described the image pickup system including the camera to which the lens apparatus is detachably attached, and the lens apparatus (and its peripheral devices) included in the image pickup system. However, examples of the present invention are not limited thereto and include a lens-integrated camera and an image pickup system including such a lens-integrated camera. Further, the image pickup system may be constituted by only the above-mentioned lens apparatus and camera, and may be constituted by adding an arithmetic device such as a computer to the above-mentioned lens apparatus and camera.

Furthermore, an example of the present invention may be realized as an image processing apparatus (arithmetic device) that appropriately synthesizes distance information generated (calculated) based on a detection result by an AF sensor and a captured image captured by a camera to generate an output image.

Moreover, each of the above examples described the case where the displaying part 205 is provided on the camera 2. However, the displaying part may be provided separately from the camera (and the lens apparatus) in the image pickup system.

In addition, each of the above examples described the case where the distance information is superimposed and displayed on the captured image. However, in the output image, the distance information may be displayed in an area separate from an area where the captured image is displayed.

As described above, the image pickup system of each example can generate, regardless of the focus state of the lens apparatus, the distance information showing at least one of the object distance in each ranging area and the difference of the object distances, based on the object distances detected by the AF sensor. Therefore, even if focusing is not respectively performed for plural objects, that is, with little or no delay to an actual change of the object distance or the object distance difference, the distance information can be displayed with the captured image.

This application claims the benefit of Japanese Patent Application No. 2008-130658, filed on May 19, 2008, which is hereby incorporated by reference herein in its entirety.

INDUSTRIAL APPLICABILITY

The present invention can provide an image pickup system and a lens apparatus which are capable of displaying distances to plural objects or a difference therebetween without performing focusing on the respective objects.

The invention claimed is:

1. An image pickup system comprising:
   a zoom lens apparatus including a zoom state detector configured to detect a zoom position, among a plurality of zoom positions of the zoom lens;
   a ranging sensor configured to detect a phase difference between object images formed with light entering the lens apparatus;
   a camera configured to perform moving image pickup of objects in an image pickup area through the lens apparatus;
   a first microprocessor programmed to execute:
      a setting task that stores positions and sizes of plural ranging areas in relation to the ranging sensor in the image pickup area, and that changes at least one of positions or sizes of the plural ranging areas based on the zoom position detected by the zoom state detector and the stored positions and sizes; and
      a calculating task that calculates an object distance in each of the plural ranging areas based on an output from the ranging sensor; and
   a second microprocessor programmed to execute:
      an output image generator task that generates an output moving image containing (a) a captured moving image captured by the camera and (b) distance information indicating at least one of the object distance calculated by the calculating task in each of the plural ranging areas or a relative distance calculated as a difference between the object distances calculated by the calculating task in the plural ranging areas, to be displayed on a display device.

2. An image pickup system according to claim 1, wherein the output image generator task generates the output image in which the distance information is superimposed on the captured moving image at a position determined according to the positions of the ranging areas.

3. A lens apparatus used for an image pickup system that includes a camera configured to perform moving image pickup of objects in an image pickup area through the lens apparatus, the lens apparatus comprising:
a zoom lens apparatus including a zoom state detector configured to detect a zoom position, among a plurality of zoom positions of the zoom lens;
a ranging sensor configured to detect a phase difference between object images formed with light entering the lens apparatus; and
a first microprocessor programmed to execute:
a setting task that stores positions and sizes of plural ranging areas in relation to the ranging sensor in the image pickup area, and that changes at least one of positions or sizes of the plural ranging areas based on the zoom position detected by the zoom state detector and the stored positions and sizes; and
a calculating task that calculates an object distance in each of the plural ranging areas, based on an output from the ranging sensor,
wherein the image pickup system includes a second microprocessor programmed to execute:
an output image generator task that generates an output moving image containing (a) a captured moving image captured by the camera and (b) distance information indicating at least one of the object distance calculated by the calculating task in each of the plural ranging areas or a relative distance calculated as a difference between the object distances calculated by the calculating task in the plural ranging areas, to be displayed on a display device.

4. A lens apparatus according to claim 3, wherein the calculating task calculates, in each of the ranging areas, the object distances on a basis of a phase difference between object images formed with light entering the lens apparatus.

5. A lens apparatus according to claim 3, wherein the first microprocessor is further programmed to execute a focus control task that performs focus control based on the phase difference.

6. An image pickup system according to claim 1, wherein:
the phase difference detector includes plural pairs of line sensors in each of the plural ranging areas, and
the calculating task selects at least one of the plural pairs of line sensors in each of the plural ranging areas, and calculates the object distance in each of the plural ranging areas on a basis of the phase difference between the image signals from the at least one of the plural pairs of line sensors.

7. A lens apparatus according to claim 3, wherein:
the phase difference detector includes plural pairs of line sensors in each of the plural ranging areas, and
the calculating task selects at least one of the plural pairs of line sensors in each of the plural ranging areas, and calculates the object distance in each of the plural ranging areas on a basis of the phase difference between the image signals from the at least one of the plural pairs of line sensors.

8. An image pickup system comprising:
a zoom lens apparatus including a zoom state detector configured to detect a zoom position, among a plurality of zoom positions of the zoom lens;
a ranging sensor configured to detect a phase difference between object images formed with light entering the lens apparatus;
a camera configured to perform moving image pickup of objects in an image pickup area through the lens apparatus;
a first microprocessor programmed to execute:
an area setting task that selects positions and sizes of plural ranging areas in relation to the ranging sensor in the image pickup area and that changes at least one of positions or sizes of the plural ranging areas based on the zoom position detected by the zoom state detector, and the selected positions and sizes;
a calculating task that calculates an object distance in each of the plural ranging areas based on an output from the ranging sensor; and
a second microprocessor programmed to execute:
an output image generator task that generates an output moving image containing (a) a captured moving image captured by the camera and (b) distance information indicating at least one of the object distance calculated by the calculating task in each of the plural ranging areas or a relative distance calculated as a difference between the object distances calculated by the calculating task in the plural ranging areas, to be displayed on a display device.

9. A zoom lens apparatus used for an image pickup system that includes a camera configured to perform moving image pickup of objects in an image pickup area through the zoom lens apparatus, the zoom lens apparatus comprising:
a zoom state detector configured to detect a zoom position, among a plurality of zoom positions of the zoom lens;
a ranging sensor configured to detect a phase difference between object images formed with light entering the lens apparatus; and
a first microprocessor programmed to execute:
an area setting task that selects positions and sizes of plural ranging areas in relation to the ranging sensor in the image pickup area, and that changes at least one of positions or sizes of the plural ranging areas based on the zoom position detected by the zoom state detector and the selected positions and sizes; and
a calculating task that calculates an object distance in each of the plural ranging areas based on an output from the ranging sensor, and
wherein the image pickup system includes a second microprocessor programmed to execute:
an output image generator task that generates an output moving image containing (a) a captured moving image captured by the camera and (b) distance information indicating at least one of the object distance calculated by the calculating task in each of the plural ranging areas or a relative distance calculated as a difference between the object distances calculated by the calculating task in the plural ranging areas, to be displayed on a display device.

10. An image pickup system comprising:
a zoom lens apparatus including a zoom state detector configured to detect a zoom position, among a plurality of zoom positions of the zoom lens;

a ranging sensor configured to detect a phase difference between object images formed with light entering the lens apparatus;
a camera configured to perform moving image pickup of objects in an image pickup area through the lens apparatus;
at least one microprocessor programmed to execute:
a setting task that stores positions and sizes of plural ranging areas in relation to the ranging sensor in the image pickup area, and that changes at least one of positions or sizes of the plural ranging areas based on the zoom position detected by the zoom detector and the stored positions and sizes;
a calculating task that calculates an object distance in each of the plural ranging areas based on an output from the ranging sensor; and
an output image generator task that generates an output moving image containing (a) a captured moving image captured by the camera and (b) distance information indicating at least one of the object distance calculated by the calculating task in each of the plural ranging areas or a relative distance calculated as a difference between the object distances calculated by the calculating task in the plural ranging areas, to be displayed on a display device.

11. An image pickup system comprising:
a zoom lens apparatus including a zoom state detector configured to detect a zoom position, among a plurality of zoom positions of the zoom lens;
a ranging sensor configured to detect a phase difference between object images formed with light entering the lens apparatus;
a camera configured to perform moving image pickup of objects in an image pickup area through the lens apparatus,
at least one microprocessor programmed to execute:
an area setting task that selects positions and sizes of plural ranging areas in relation to the ranging sensor in the image pickup area and that changes at least one of positions or sizes of the plural ranging areas based on the zoom position detected by the zoom state detector and the selected positions and sizes;
a calculating task that calculates an object distance in each of the plural ranging areas based on an output from the ranging sensor; and
an output image generator task that generates an output moving image containing (a) a captured moving image captured by the camera and (b) distance information indicating at least one of the object distance calculated by the calculating task in each of the plural ranging areas or a relative distance calculated as a difference between the object distances calculated by the calculating task in the plural ranging areas, to be displayed on a display device.

12. An image pickup method for an image pickup system including a zoom lens apparatus including a zoom state detector configured to detect a zoom position, among a plurality of zoom positions of the zoom lens, a ranging sensor configured to detect a phase difference between object images formed with light entering the lens apparatus, and a camera configured to perform moving image pickup of objects in an image pickup area through the lens apparatus, the method comprising:
a setting step of storing positions and sizes of plural ranging areas in relation to the ranging sensor in the image pickup area, and changing at least one of positions or sizes of the plural ranging areas based on the zoom position detected by the zoom state detector and the stored positions and sizes;
a calculating step of calculating an object distance in each of the plural ranging areas based on an output from the ranging sensor; and
an output image generating step of generating an output moving image containing (a) a captured moving image captured by the camera and (b) distance information indicating at least one of the object distance calculated in the calculating step in each of the plural ranging areas or a relative distance calculated as a difference between the object distances calculated in the calculating step in the plural ranging areas, to be displayed on a display device.

13. An image pickup method for an image pickup system including a zoom lens apparatus including a zoom state detector configured to detect a zoom position, among a plurality of zoom positions of the zoom lens, a ranging sensor configured to detect a phase difference between object images formed with light entering the lens apparatus, and a camera configured to perform moving image pickup of objects in an image pickup area through the lens apparatus, the method comprising:
an area setting step of selecting positions and sizes of plural ranging areas in relation to the ranging sensor in the image pickup area and changing at least one of positions or sizes of the plural ranging areas based on the zoom position detected by the zoom state detector and the selected positions and sizes;
a calculating step of calculating an object distance in each of the plural ranging areas based on an output from the ranging sensor; and
an output image generating step of generating an output moving image containing (a) a captured moving image captured by the camera and (b) distance information indicating at least one of the object distance calculated in the calculating step in each of the plural ranging areas or a relative distance calculated as a difference between the object distances calculated in the calculating step in the plural ranging areas, to be displayed on a display device.

* * * * *